United States Patent [19]

Semur et al.

[11] 4,197,428
[45] Apr. 8, 1980

[54] SEGMENTED MATRIX TYPE SWITCHING DEVICE WITH SIMPLIFIED CONTROL

[75] Inventors: Pierre Semur, Evry; Jacques Tanguy, Antony, both of France

[73] Assignee: Compagnie Industrielle des Telecommunications Cit-Alcatel, Paris, France

[21] Appl. No.: 895,419

[22] Filed: Apr. 11, 1978

[30] Foreign Application Priority Data

Apr. 21, 1977 [FR] France .................. 77 11999

[51] Int. Cl.² .................................. H04Q 3/50
[52] U.S. Cl. ........................ 179/18 GF; 340/166 R
[58] Field of Search .............. 179/18 GF; 340/166 R

[56] References Cited

U.S. PATENT DOCUMENTS 3,215,782  11/1965  Deller et al. ............. 179/18 GF
3,666,892  5/1972   Hestad ................... 179/18 GF X Primary Examiner—Thomas W. Brown Attorney, Agent, or Firm—Sughrue, Rothwell, Mion, Zinn and Macpeak

[57] ABSTRACT

Low-level, wide-band signals e.g. for use in telephone transmission are switched in a matrix device. The overall matrix is subdivided into elementary matrices of smaller size and each inlet of the overall matrix is provided with a selector for selecting the appropriate elementary matrix which contains the desired cross-point. This subdivision is performed as is conventional to reduce interference and attenuation from echos generated in the unused portions of the matrix, but it has the drawback of increasing the complexity of switch control, two selectors and one cross-point needing activation in the place of a single cross-point. The present invention provides selectors which are sensitive to the conductive state of the cross-points to which they are directly connected to repeat the conductive condition to their respective inlet of the overall matrix, thereby simplifying switching control without sacrificing transmission characteristics.

3 Claims, 4 Drawing Figures

SEGMENTED MATRIX TYPE SWITCHING DEVICE WITH SIMPLIFIED CONTROL

The present invention relates to the switching of low-level, wide-band electrical signals.

In transmission networks several possible paths are often provided for signal transmission for security reasons. The choice between paths is performed at stations of the transmission network by means of switching devices which route the transmission signals from inlet paths to outlet paths. Known switching devices for this sort of application are made in matrix form. They comprise two sets of conductors, one of which forms the columns and the other the rows of a matrix, and electronic or electro-mechanical switching points are disposed between the two sets of conductors at the intersections of the rows and the columns. They have row inlets constituted by one of the ends of the set of conductors which form the rows of the matrix, and column inlets constituted by one of the ends of the set of conductors which form the columns of the matrix. For reasons of impedance matching, a row inlet is connected to no more than one column inlet and vice versa. Connection between a row inlet and a column inlet is obtained by closing the switching point situated at the intersection of the row and column in question.

Switching devices realised in the above form can only have a very limited capacity since the electrical characteristics of a connection between a row and a column are rapidly degraded when the size of the matrix is increased. These characteristics depend not only on the electrical characteristics of the closed switching point situated at the intersection of the row and the column in question, but also on the characteristics of the open switching points directly connected to the row and the column in question. Further, for any electrical connection between a row inlet and a column inlet, there is some part of the cabling constituting the row and the column in question which is in shunt on the connection and which causes interfering reflections that increase with increasing size of the matrix.

For these reasons, large capacity devices have their switching matrix cut up into a grid of row and column segments which define a network of elementary matrices. The segments of one row have one of their ends connected to the outlets of a selector whose inlet corresponds to the inlet of the row in question of the switching matrix. Likewise the segments of a single column are connected by one of their ends to the outlets of a selector whose inlet corresponds to the inlet of the column in question of the switching matrix. A connection between a row inlet and a column inlet of the switching matrix is obtained by positioning the selectors of the row inlet and the column inlet in question so as to select the elementary matrix which contains both a segment of the said row and a segment of the said column, and then closing the switching point situated at the intersection of the said segments in the said elementary matrix. It provides better electrical characteristics since, above a certain capacity, the open switching points which are directly connected to the connection (which are those directly connected to the selectors in question and those directly connected to the row and column segments of the elementary matrix) are fewer than those which are in fact connected to the entire row and the entire column in question. Further, the length of the portions of cabling which are in shunt on the connection is reduced and remains shorter than that of a row segment or of a column segment.

While cutting up the switching matrix into elementary matrices brings improvements to the electrical characteristics of its connections, these improvements are paid for by a complication of the control of the device, since control of the selectors must be added to that of the switching points of the elementary matrices.

In known devices, the control of the selectors is performed independently of the control of the switching points of the elementary matrices which gives rise to highly complex checking control circuits. The aim of the present invention is to simplify the structure of the control circuits of switching devices of the kind described above.

The present invention provides a matrix type switching device comprising:

a switching matrix provided with row inlets and column inlets and having row and column conductors cut up into segments according to a grid defining a network of elementary matrices, one selector per row having one inlet connected to an inlet for the row in question and a number of outlets equal to the number of segments of the row in question, each connected to one of the ends of a different segment of the row in question, one selector per column having one inlet connected to the inlet of the column in question and a number of outlets equal to the number of segments of the column in questions, each connected to one of the ends of a different segment of the column in question, elementary matrix switching points, having two states, blocked or conducting controlled by a control circuit and disposed in the elementary matrices at the intersections of the row segments and the column segments, selector switching points having two states, blocked or conducting, disposed in each selector one per outlet and connected between the inlet and the selector outlet in question, and sensitive to the conductive state, which they repeat, of any of the elementary matrix switching points to which the outlet in question is directly connected, and the said control circuit.

According to a preferred embodiment, the switching points are realised by diodes which are normally blocked, but which are made conductive to a low-level, wide-band signal by the application of direct current. The switching device then comprises:

elementary matrix switching points which are identical to each other and each formed by two diodes connected in series and in opposite directions, selector switching points which are identical to each other and each formed of a diode connected in the same direction as the diode of each elementary matrix switching point to which it is directly connected, constant current sources which are blocked or not by the control circuit, each connected between earth and the point connecting the diodes of one switching point of the elementary matrix in a direction such that the said diodes pass the current supplied by the source in question, a resistance connected between the inlet of each selector and earth, an isolating capacitor inserted before the inlet of the selector.

Other characteristics and advantages of the invention will appear from the appended claims and from the following description of an embodiment given by way of example. The description is made with reference to the drawings in which:

FIG. 1 shows the arrangement of switching points in a device enabling electrical connections to be established between nine inlet columns referenced by the numbers 11 to 19, and connected for example to nine inlet paths, and twelve inlet rows indexed by the numbers 20 to 31 and connected for example to twelve outlet paths. In this FIG. 1 the switching points are shown as points.

Figure 1:
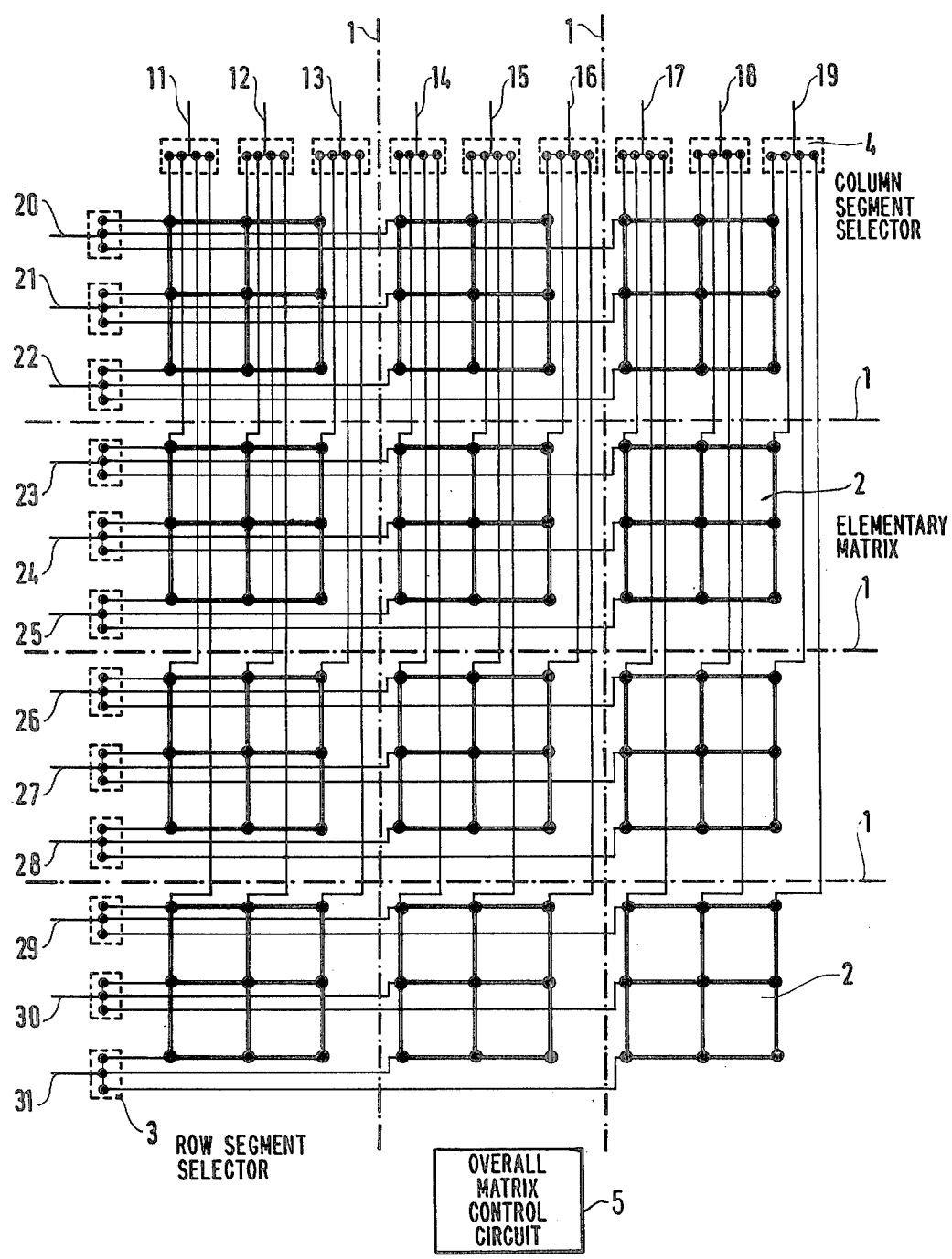
FIG. 1 shows the arrangement of switching points of a large capacity device in accordance with the invention.

The overall switching matrix of the device has nine columns and 12 rows. It is divided by a grid 1 of dot-dashed lines into a network of elementary matrices 2. Each of these have three rows and three columns formed by row segments and column segments of the overall matrix and shown in bold lines. The three segments of a single row of the overall matrix are each connected by one of their ends to one of three outlets of a selector 3 having its inlet connected to the row inlet of the overall matrix corresponding to the row in question. Likewise the four segments of a single column of the overall matrix are each connected by one of their ends to the four outlets of the selector 4 connected by its inlet to the column inlet of the overall matrix corresponding to the column in question. The selectors include one switching point between their respective inlets and each of their outlets. The row segment selectors 3 are shown in a column to the left of the network of elementary matrices 2. The selector 4 of the column segments are shown along a line above the network of elementary matrices 2.

The division of the overall switching matrix of the device into a network of smaller elementary matrices 2 addressed by means of selectors reduces both the number of open switching points directly connected to an electrical connection and the length of cabling which may shunt the connection and give rise to interfering reflections.

An electrical connection is established by putting three switching points in the closed state in series. A first one of the switching points belonging to a row segment selector 3, a second one to a column segment selector 4 and a third to an elementary matrix 2. According to the invention, the electrical connection is established by an overall matrix control circuit 5 which directly controls each of the switching points in the elementary matrices 2. The switching points in the row and column selectors repeat the states of the switching points in the elementary matrices thereby simplifying the control circuit. The switching points in the open state which are connected thereto are the remaining switching points of the row segment selector and the column segment selector used by the connection together with those switching points of the elementary matrix in question which have one side connected to the row or the column segments used by the connection. In the example shown there are nine such open switching points: two belonging to the row segment selector 3, three belonging to the column segment selector 4 and four belonging to the elementary matrix. If the overall switching matrix had not be divided into a network of elementary matrices there would be nineteen such open switching points: eight in the row used by the connection and eleven in the column. It can be shown that the reduction in the number of open switching points directly connected to an electrical connection increases as the capacity of the switching device increase.

The lengths of cabling which may be shunted across the electrical connection are reduced to those of a row segment and a column segment while without division into elementary matrices they could be as long as the length of one row and one column of the overall switching matrix.

Figure 2:
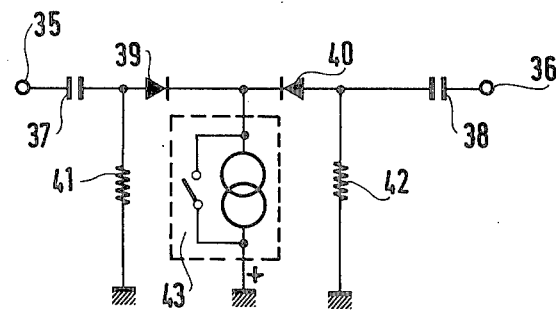
FIG. 2 is a circuit diagram of a prior art diode switching point for a wide band signal.

FIG. 2 shows a conventional circuit diagram of a switching point for a low-level, wide-band signal using diodes which are blocked in a rest position and which are opened by applying a direct current thereto.

The switching point comprises two inlets 35 and 36 connected via isolating capacitors 37 and 38 to two diodes 39 and 40 which are connected in series by their cathodes. Each diode 39 or 40 has its anode connected to earth via a respective resistor 41 or 42. A controllable constant current source 43 represented as a current generator capable of being short-circuited by a switch, is connected to earth via its positive terminal and to the point joining the cathodes of the two diodes 39 and 40 via its negative terminal.

When the switch is closed, the diodes 39 and 40 have their cathodes connected to earth and they are blocked since they are passing no bias current. A signal cannot propagate from one inlet to the other since to do so it would have to pass to earth and pass through the diodes 39 and 40 which are in a high impedance condition.

When the switch is open, the current source 43 has a large impedance which isolates earth from the cathodes of the diode 39 and 40. Further, a constant current flows from the node at the junction of the cathodes of the diodes 39 and 40 through the current source 43. The current into the node is composed of a current which flows through the resistance 41 and the diode 39 in its forward direction and a current which flows through the resistance 42 and the diode 40 in its forward direction thereby biasing the diodes 39 and 40. A signal applied at one inlet propogates to the other via the diodes 39 and 40 by adding to one of the currents flowing into the node at the junction of the cathodes of the diodes 39 and 40 and subtracting from the other.

The resistors 41 and 42 serve not only to close the loop to earth for the fractions of constant current supplied by the source 43, but also to match the impedances of the inlets 35 and 36 of the switching point in the passing state, i.e. when the switch is open.

The realisation of the current source 43 is conventional. Its control is also conventional.

Figure 3:
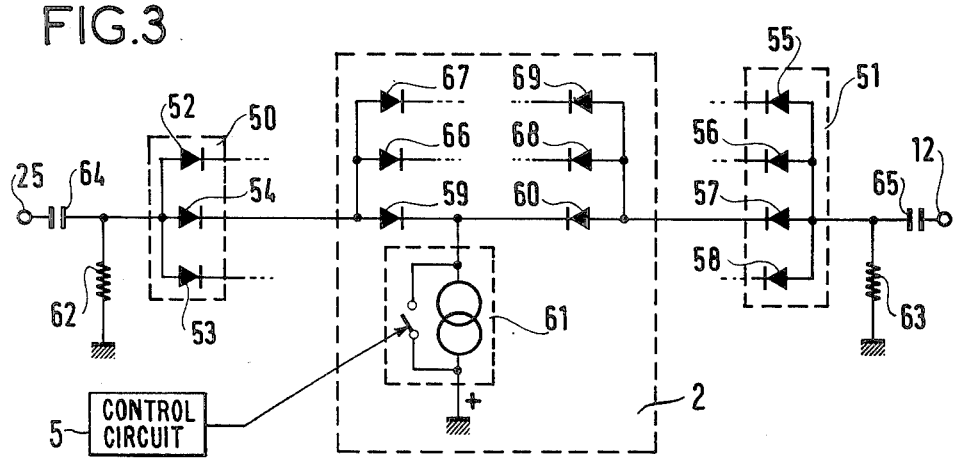
FIG. 3 is a circuit diagram of an electrical connection as established in a switching device in accordance with the invention.

FIG. 3 shows the circuit of an electrical connection between one row inlet and one column inlet of a switching device whose switching points are arranged according to FIG. 1. This switching device uses two types of diode switching points, one for the selectors and the other for the elementary matrices, whose operation is reminiscent of the switching point described with reference to FIG. 2.

The electrical connection chosen by way of example and shown in FIG. 3 is that which can be established in the switching device between its sixth row inlet 25 and its second column inlet 12. This connection uses one row selector 50 and one column selector 51 to choose that elementary matrix 2 which includes both a segment of the sixth row and a segment of the second column, and the said elementary matrix 2.

The selectors of the switching device each include a first type of switching point between their inlet and each of their outlets. This first type of switching point is formed by a diode having its anode connected to the inlet and its cathode connected to the outlet in question. The selectors are also connected via their inlets firstly to a row or column inlet of the switching device via an isolating capacitor and secondly to earth via an impedance matching resistor. In FIG. 3 the three diodes of the row segment selector 50 are referenced 52, 53 and 54, and the four diodes of the column segment sector 51 are referenced 55, 56, 57 and 58. The inlet of the row segment selector 50 is connected to earth via a resistor 62 and to the sixth row inlet 25 of the switching device via a capacitor 64. Likewise the inlet of the column segment selector 51 is connected to earth via a resistor 63 and to the second column inlet 12 of the switching device via a capacitor 65. To improve the clarity of FIG. 3 only the electrical connections of the diodes 54 and 57 which are in the electrical connections used as example have been shown in their entirety.

At the points of intersection of the row segments and the column segments which constitute the elementary matrices 2 there are switching devices of a second type, each formed by two diodes connected in series by their cathodes and by a constant current source connected by its negative terminal to the cathodes of the diodes and by its positive terminal to earth. In FIG. 3 the elementary matrix 2 containing the switching point connecting a segment of the sixth row to a segment of the second column is shown in part. This switching point is formed by diodes 59 and 60 connected in series by their cathodes and by a controllable constant current source 61 connected via its negative terminal to the cathodes of the diodes 59 and 60 and via its positive terminal to earth. The switching points connected to the same segment of the sixth row as the switching point realised by the diodes 59 and 60 are shown in part by their diodes 66 and 67 which are connected via their anodes to the anode of the diode 59. Likewise the switching points connected to the same segment of the second column as the switching point realised with the diodes 59 and 60 are shown in part by their diodes 68 and 69 which are connected by their anodes to the anode of diode 60.

The control of the connection is obtained solely by controlling the constant current source 61.

When the current source 61 is unblocked, i.e. when the switch placed in parallel with the current generator constituting the source is open, it has a high impedance which isolates the cathodes of diodes 59 and 60 from earth. Also it delivers a constant current which is divided into two parts, one of which flows through the resistor 62 and the diodes 54 and 59 in their forward direction and the other flows through the resistor 63 and the diodes 57 and 60 in their forward direction thereby biasing the diodes 54, 59, 60 and 57. A signal applied on one of the inlets propogates towards the other inlet via the diodes 54, 59, 60 and 57 by adding to one part of the current supplied by the source 61 and subtracting from the other.

When the constant current source 61 is blocked, that is to say when the switch connected in parallel with the current generator which constitutes the source is closed, it has zero impedance and earths the cathodes of the diodes 59 and 60. These diodes are then blocked and present a high impedance. No signal can then propogate from one inlet to the other since such a signal would have to pass through the high impedance of the diodes 59 and 60 as well as earth. The diodes 54 and 57 are likewise blocked when a biasing current is not passing through them from the current source of the switching points such as the one to which the diodes 66, 67, 68 and 69 belong.

The closing of a switching point of an elementary matrix, obtained by unblocking the constant current source associated therewith, causes the switching points of the selectors with which it is in series to be likewise closed. Because of this property, the control of the switching points of the device is limited to that of the switching points of the elementary matrices and can be performed as though the device did not have selectors and had its switching points distributed over a single switching matrix. This control can therefore be performed in the same way as for prior art devices whose switching points are indeed distributed over a single matrix.

Figure 4:
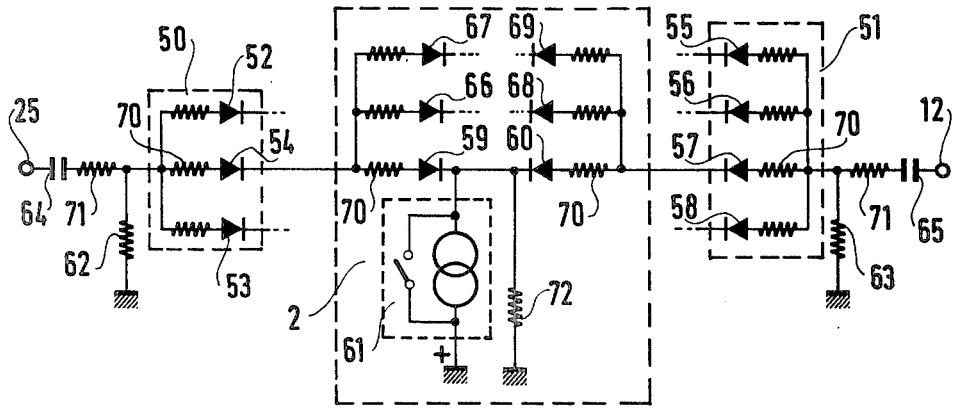
FIG. 4 is a circuit diagram of an electrical connection as established in a variant of the preceding switching device.

The reflection coefficients measured at the inlets 25 and 12 of the connection are fairly poor because of the non-zero impedance of the diodes in the conductive state. To improve this state of affairs it is advantageous to incorporate the switching points of the selectors and of the elementary matrices in T-structure or $\pi$ structure attenuators having a characteristic impedance equal to the desired impedance for the inlets of the connection. FIG. 4 shows such modifications made to the electrical connection shown in FIG. 3. In addition to the elements of FIG. 3 which are retained with their original reference numbers, the circuit of FIG. 4 includes resistors 70 placed in series with each of the diodes, resistors 71 inserted in series with the isolating capacitors 64 and 65, and a resistor 72 disposed in parallel with the constant current source 61. These resistors integrate the diodes 54, 59, 60 and 57 through which the signal propogates into three successive T-structure attenuators (in this example) thereby considerably improving the reflection coefficients of the connection.

Naturally the invention is not limited to the switching device described but may be applied to a switching device of any capacity.

What is claimed is:

1. A matrix-type switching device comprising:
   a switching matrix provided with row inlets and column inlets and having row and column conductors cut up into segments according to a grid defining a network of elementary matrices,
   one selector per row having one inlet connected to an inlet for the row in question and a number of outlets equal to the number of segments of the row in question, each connected to one of the ends of a different segment of the row in question,
   one selector per column having one inlet connected to the inlet of the column in question and a number of outlets equal to the number of segments of the column in question, each connected to one of the ends of a different segment of the column in question,
   a control circuit,
   elementary matrix switching points, having two states, blocked or conducting controlled by said control circuit and disposed in the elementary matrices at the intersections of the row segments and the column segments, and selector switching point means having two states, blocked or conducting, disposed in each selector, one per outlet, and connected between the inlet and the selector outlet in question, for repeating the conductive state, of any of the elementary matrix switching points to which the outlet in question is directly connected.

2. A switching device according to claim 1 comprising:

elementary matrix switching points which are identical to each other and each formed by two diodes connected in series and in opposite directions, selector switching points which are identical to each other and each formed of a diode connected in the same direction as the diode of each of the elementary matrix switching point to which it is directly connected, constant current sources which are blocked or not by said control circuit, each connected between earth and the point connecting the diodes of one switching point of the elementary matrix in a direction such that the said diodes pass the current supplied by the source in question, a resistance connected between the inlet of each selector and earth, and an isolating capacitor inserted before the inlet of the selector.

3. A switching device according to claim 2 wherein the diodes of the selector and elementary matrix switching points are disposed in impedance matching attenuators.

* * * * *